United States Patent [19]

Robertson

[11] Patent Number: 5,500,128
[45] Date of Patent: Mar. 19, 1996

[54] HIGH CALCIUM TOLERANT DEPOSIT CONTROL METHOD

[75] Inventor: Jennifer J. Robertson, Coatesville, Pa.

[73] Assignee: Betz Laboratories, Inc., Trevose, Pa.

[21] Appl. No.: 384,996

[22] Filed: Feb. 7, 1995

Related U.S. Application Data

[63] Continuation-in-part of Ser. No. 202,404, Feb. 25, 1994, abandoned.

[51] Int. Cl.$^6$ ..................................................... C02F 5/14
[52] U.S. Cl. ............................ 210/699; 209/5; 210/701; 252/180
[58] Field of Search ....................... 209/5; 210/698–701; 252/180

[56] References Cited

U.S. PATENT DOCUMENTS

| | | | |
|---|---|---|---|
| 4,479,878 | 10/1984 | Becker | 210/699 |
| 4,659,481 | 4/1989 | Chen | 210/697 |
| 4,936,987 | 6/1990 | Perswski et al. | 210/701 |
| 5,080,801 | 1/1992 | Molter et al. | 210/699 |
| 5,124,046 | 6/1992 | Sherwood et al. | 210/699 |
| 5,282,976 | 2/1994 | Yeung | 210/699 |

Primary Examiner—Peter A. Hruskoci
Attorney, Agent, or Firm—Alexander D. Ricci; Richard A. Paikoff

[57] ABSTRACT

A method and composition for controlling deposition of scale and the like in waters having a high calcium ion content is disclosed. The composition comprises a combination of an alkylidene diphosphonic acid and a water soluble polymeric material.

7 Claims, No Drawings

HIGH CALCIUM TOLERANT DEPOSIT CONTROL METHOD

This is a continuation-in-part of application Ser. No. 081202,404, filed Feb. 25, 1994.

FIELD OF THE INVENTION

The present invention pertains to a method and composition for controlling undesirable deposit formation in water systems and along metal surfaces and the like in contact with such water systems. Of particular importance is the fact that the present method and composition is adapted for use in conjunction with those water systems having a high calcium ion concentration. In such cases, the use of conventional deposit control agents leads to the formation of undesirable deposit control agent–calcium adducts, which seriously interfere with the intended functioning of the deposit control agent.

BACKGROUND OF THE INVENTION

Deposit control agents such as phosphates, phosphonates, and polyacrylates, show similar responses as the concentration of calcium is increased in cooling waters and the like with the potential for precipitation of slightly soluble calcium salts. At very low (substoichiometric) treatment levels, these deposit control materials inhibit the nucleation and growth of crystals of calcium salts. The mechanism for this activity involves adsorption of the deposit control agent at the active growth site of the forming microcrystallites. If the concentration of calcium is increased, turbidity develops in the cooling water, indicating the formation of insoluble, calcium-deposit control agent adducts. If the deposit control agent concentration is increased to stoichiometric concentrations, this turbidity can be removed by chelation of the calcium ion to produce soluble calcium containing species.

Because of the economics of water treatment in cooling systems, deposit control agents must function at substoichiometric concentrations. In waters containing high calcium concentrations, such as might be found in cooling systems operating at high cycles of concentration, calcium tolerant deposit control agents offer a distinct advantage. The concentration of these materials can be increased to meet the deposit control demands of the system without concern for their removal by formation of calcium containing adducts.

Formation of calcium-deposit control agent adducts has obvious negative consequences. The active or "free" deposit control agent concentration is limited, thus limiting deposition and corrosion control. Also, the adduct itself may foul the cooling system through the formation of an adduct deposit.

In order to alleviate this problem, the calcium concentration is often controlled by operating at lower cycles of concentration. However, such a procedure also has obvious economic disadvantages. Thus, a deposit control agent that is tolerant to high calcium concentrations provides definite advantages when used in cooling water systems and the like. The high treatment concentrations that may be required due to the deposition potential created by high calcium concentrations can be used without fear of fouling or loss of corrosion protection. Cycles of concentration may not be limited, providing economic benefits and conservation of water.

Accordingly, there is a need in the art for a method and composition of controlling deposition in high calcium ion content waters, which do not result in the substantial formation of adducts comprised of calcium ions and the deposit control agent.

DETAILED DESCRIPTION OF THE INVENTION

It has been surprisingly discovered that an alkylidene diphosphonic acid, e.g., 1-hydroxypropylidene-1,1-diphosphonic acid (HPDP), in combination with various water soluble polymers is extremely "calcium tolerant". This phase is used to signify that the particular combinations of the present invention remain in solution in waters having calcium ion concentrations of 200 ppm and greater without forming an undesirable precipitate. Accordingly, the compositions of the present invention can exert their deposit control function in such waters without interference due to formation of calcium-deposit control agent adducts.

Although few naturally occurring waters possess calcium ion concentrations on the order of 200 ppm and greater, such water systems are typically encountered in recirculating-type cooling water systems, which for economical and environmental purposes, are forced to operate at high levels of concentration. Although the present invention is ideally suited to provide effective deposit control protection in these particular systems, the present invention is equally applicable to all water systems for which deposit control protection is sought that possess such high calcium ion concentrations. For instance, boiler water systems, scrubber systems, salt water desalination, dust collecting systems, gold ore processing waters and other water systems may benefit from the present invention.

It is noted that the terms alkylidene diphosphonic acid and HPDP used herein should be so construed as to encompass all water soluble salt forms of these molecules. Polymeric materials which are effective in the present invention include polyacrylates and sulfonic acrylic copolymers.

The phosphonate/polymer combinations are added to the aqueous system for which treatment is desired in an amount of from about 0.1 to 500 parts per million based upon 1,000,000 parts of the aqueous system. In the examples which follow, abbreviations and trade names have been used to identify the samples tested. The following legend gives the chemical names for the samples, all available from Betz Laboratories, Inc. (AHPSE signifies allyl hydroxypropyl sulfonate ether):

Polymer A: low molecular weight polyacrylic acid (polyacrylate)

Polymer B: acrylic acid/AHPSE copolymer (sulfonic acrylic copolymer)

Polymer C: low molecular weight polyacrylic acid (polyacrylate)

Polymer D: acrylic acid/AHPSE copolymer (sulfonic acrylic copolymer)

Polymer E: acrylic acid/AHPSE copolymer (sulfonic acrylic copolymer)

A series of tests designed to measure the propensity of process waters to foul were conducted. Chemical treatments were added to inhibit this fouling tendency. As shown in Table I, in high hardness, high pH waters containing 4,000 ppm $Ca^{2+}$ as $CaCO_3$, HPDP is a fair inhibitor. However, a blend of both HPDP and polymeric materials produced phosphonate/polymer combinations which displayed synergistic effects. This further increase in HPDP efficacy is shown in Table I. The decrease in inhibition efficacy of the combination products as the polymeric component increases, i.e., from a 1:1 to 1:2 weight ratio of HPDP to polymeric component, is indicative of the fact that the polymeric materials alone are poor inhibitors under these conditions. This further supports observations made at lower calcium levels under the same pH conditions. Note that, e.g., gold ore processing waters typically contain both high hardness calcium (200–4,000 ppm $Ca^{2+}$ as $CaCO_3$) and high pH (10–11) and are, therefore, supersaturated with respect to calcium carbonate.

TABLE 1

| Conditions | | | | |
|---|---|---|---|---|
| 4,000 ppm $Ca^{2+}$ as $CaCO_3$ Temperature = 40° C. pH 11 | 150 ppm $CO_3^{2-}$ as $Na_2CO_3$ Equilibration Time = 18 hours | | | |
| | Treatment Rate | | | |
| Product | 0.4 | 0.8  1.4 | 2.0 | ppm active |
| | | % Inhibition | | |
| HPDP | 0.41 | 4.05  12.8 | 29.6 | |
| | Treatment Rate | | | |
| | 0.2 | 0.4  0.7 | 1.0 | ppm active each component |
| | | % Inhibition | | |
| 1:1 HPDP/Polymer A | 5.90 | 17.3  42.8 | 59.1 | |
| 1:1 HPDP/Polymer B | 3.74 | 17.5  43.7 | 68.7 | |
| 1:1 HPDP/Polymer C | 5.60 | 27.1  56.1 | 79.9 | |
| 1:1 HPDP/Polymer D | 1.03 | 21.8  42.1 | 78.8 | |
| 1:1 HPDP/Polymer E | 1.12 | 17.4  49.2 | 75.0 | |
| | Treatment Rate | | | |
| | 0.13/0.26 | 0.27/0.54  0.47/0.93 | 0.67/1.3 | ppm active |
| | | % Inhibition | | |
| 1:2 HPDP/Polymer A | 0.81 | 13.5  32.4 | 47.2 | |
| 1:2 HPDP/Polymer B | 0.00 | 13.5  32.4 | 55.7 | |
| 1:2 HPDP/Polymer C | 0.68 | 21.2  37.2 | 58.5 | |
| 1:2 HPDP/Polymer D | 0.41 | 11.4  34.1 | 56.1 | |
| 1:2 HPDP/Polymer E | 0.00 | 9.46  30.4 | 50.7 | |

It is believed that the data in Table I demonstrates that the addition of selected phosphonates and polymers in combination can significantly enhance the inhibition efficacy of phosphonates alone. As shown, a 1:1 HPDP/Polymer C combination was particularly effective. It is expected that other alkyl analogs such as 1-hydroxyethylidene-1,1-diphosphonic acid (HEDP), 1-hydroxybutylidene-1,1-diphosphonic acid (HBDP), 1-hydroxyisobutylidene-1,1-diphosphonic acid (HIDP) or the valeric analog (HVDP) would be effective in the present invention. Furthermore, it is expected that other water soluble polymers such as polymaleic anhydride would also be effective.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

I claim:

1. A method of controlling the deposition of scale imparting precipitates on the structural parts of a gold ore processing system exposed to an aqueous medium having a calcium ion concentration of from about 200 ppm –4000 ppm and a pH of about 10–11, said method comprising adding to said aqueous medium an effective amount for the purpose of a combination of (a) 1-hydroxypropylidene-1,1-diphosphonic acid and (b) a water soluble polymer selected from the group consisting of a polyacrylic acid and an acrylic acid/allyl hydroxpropyl sulfonate ether copolymer, wherein the weight ratio of (a):(b) is from about 1:1 to 1:2.

2. The method as recited in claim 1 comprising adding from about 0.1–500 parts of said combination per million parts of said aqueous medium.

3. The method as recited in claim 1 wherein the polymer is said polyacrylic acid.

4. The method as recited in claim 1 wherein the polymer is said acrylic acid/allyl hydroxypropyl sulfonate ether copolymer.

5. The method as recited in claim 1 wherein the calcium ion concentration of said aqueous medium is from about 500–4,000 ppm.

6. The method as recited in claim 5 wherein the calcium ion concentration of said aqueous medium is from about 500–1,000 ppm.

7. The method as recited in claim 1 wherein said scale imparting precipitates comprise calcium carbonate.

* * * * *